United States Patent
Jasra et al.

(10) Patent No.: US 7,037,476 B1
(45) Date of Patent: May 2, 2006

(54) PROCESS FOR PREPARING AMORPHOUS SILICA FROM KIMBERLITE TAILING

(75) Inventors: Raksh Vir Jasra, Bhavnagar (IN); Haresh Mahipatlal Mody, Bhavnagar (IN); Hari Chand Bajaj, Bhavnagar (IN); Rajesh Shantilal Somani, Bhavnagar (IN); Jatin Rameshchandra Chunawala, Bhavnagar (IN); Hemal Ranpara, Bhavnagar (IN); Dipti Barochiya, Bhavnagar (IN); Devendra Ghelani, Bhavnagar (IN); Suresh Chandra, Hyderabad (IN); Maharaj Kishen Dhar, Hyderabad (IN); Keshav Rao, Hyderabad (IN); Kamlesh Kumar, Hyderabad (IN)

(73) Assignees: Council of Scientific and Industrial Research, New Delhi (IN); National Mineral Development Corporation Limited, Hyderabad (IN)

( * ) Notice: Subject to any disclaimer, the term of this patent is extended or adjusted under 35 U.S.C. 154(b) by 0 days.

(21) Appl. No.: 11/024,005

(22) Filed: Dec. 27, 2004

(51) Int. Cl.
*C01B 33/12* (2006.01)
*C01B 33/142* (2006.01)
*C01B 33/143* (2006.01)

(52) U.S. Cl. ............. 423/339; 106/481; 106/482; 106/483; 106/484; 106/492; 423/335

(58) Field of Classification Search ............... 106/481, 106/482, 483, 484, 492; 423/335, 339
See application file for complete search history.

(56) References Cited

U.S. PATENT DOCUMENTS

| | | | |
|---|---|---|---|
| 4,243,428 A | 1/1981 | Donnet et al. |
| 4,495,167 A | 1/1985 | Nauroth et al. |
| 5,034,207 A | 7/1991 | Kerner et al. |
| 5,094,829 A | 3/1992 | Krivak et al. |
| 5,123,964 A | 6/1992 | Kerner et al. |
| 5,342,598 A | 8/1994 | Persello |
| 5,851,502 A | 12/1998 | Turk et al. |
| 6,180,076 B1 | 1/2001 | Uhrlandt et al. |
| 6,214,912 B1 | 4/2001 | Chevallier et al. |
| 6,468,493 B1 | 10/2002 | Chevallier et al. |
| 6,702,888 B1 | 3/2004 | Bomal et al. |
| 6,800,267 B1 | 10/2004 | Schubert et al. |
| 2003/0118500 A1 | 6/2003 | Chevallier et al. |

FOREIGN PATENT DOCUMENTS

IN 176707 2/1991

OTHER PUBLICATIONS

Abstract of Indian Patent No. 176,707, The Gazette of India, Aug. 24, 1996, pp. 625-626.
Anonymous: "Annual Report Mar. 2002: Chapter-VI Research and Development", Internet Article, 'Online' 2003, pp. 1-20, XP-002327131.

*Primary Examiner*—Anthony J. Green
(74) *Attorney, Agent, or Firm*—Darby & Darby

(57) ABSTRACT

A new process is described for the preparation of free flowing hydrated amorphous silica from kimberlite tailing—a waste in diamond mining. The process comprises treating of kimberlite with acid, further reacting it with alkali solution to obtain soluble metal silicate solution, which is subsequently neutralized with mineral acid to polymerize silica as insoluble precipitates. The products is useful in rubber, paints as abrasive etc.

15 Claims, No Drawings

PROCESS FOR PREPARING AMORPHOUS SILICA FROM KIMBERLITE TAILING

FIELD OF THE INVENTION

The present invention relates to a process for the preparation of amorphous silica from Kimberlite tailings and more particularly the invention relates to the utilization of silica in Kimberlite to prepare soluble alkali metal silicates and subsequently neutralization of it with acidifying agents viz. mineral acid in dilute form to obtain amorphous powder.

BACKGROUND OF THE INVENTION

Silica is particularly useful in reinforcing elastomers such as rubbers and in improving the resistance of rubbers to abrasion. They are also used as a carrier for dentally active substances, which are stored at the site of action and then release the active substance in small doses over a relatively long period of time (deposition effect, controlled release). The silica thus act as active substance stores which contain the active substance in absorbed, adsorbed or chemisorbed form. Any form of silica e.g., precipitated silica or silica gels or pyrogenic silica, maybe used. Silica are also used in particular for catalysis, inks and paper, in the food industry.

In catalysis, silica is used as a catalyst support, or as a porous layer coated or impregnated on monolithic supports. Due to its optical whiteness and opacity, silica is used as an inorganic charge in papers and also specialty papers. Silica is used in paper because of its porosity, which facilitates ink absorption. More particularly in the field of anal feeds, silica is used as a result of its absorption properties as a feed support, particularly as a support for methionine, vitamins, particularly vitamin A and E, for sucroglycerides, etc.

It is remarkable that precipitated silica of such widely different structures and properties can be made simply by mixing acid and sodium silicate in different ways at suitable times and temperature. It requires knowledge or reaction conditions in hot solution that leads to the following processes
1. Nucleation of particles
2. Growth of particles to a desired size
3. Coagulation to form aggregates by control of pH and metal ion concentration
4. Reinforcement of the aggregate structure to the desired degree without further nucleation.

U.S. Pat. No. 4,243,428 discloses a process wherein precipitated silica is obtained by neutralization of a solution of sodium silicate with an acid under conditions which influence the properties of the silica finally obtained. The products obtained have a specific surface area ranging between 100 and 600 $m^2/g$, which do not vary upon drying, due to the action of a strong acid on an alkaline silicate. The addition of strong acid to the alkaline silicate is interrupted one to three times. According to another embodiment of this prior art, the strong acid is added to the silicate solution in two phases wherein the temperature of the second phase is marginally higher than the first phase and both the phased were interrupted by a specific time factor. Also According to another embodiment of this prior art the temperature of the reacting medium is varied during two phases in which strong acid is successively added to the silicate, separated by one interruption. Another embodiment of this prior art is the speed at which the acid is added. According to a preferred embodiment of this prior invention to obtain silica having particle size less than about 20 μm, the acid is added to the silicate at a rate varying according to a law such that the residual alkalinity and the concentration of the total silica decrease linearly as a function of the reaction time, in accordance with the following equation in which:

$$D = \frac{Vi(Ci/62 + Ca/98)Ci/62}{T(Ci/62 + Ca/98 - Ci \times t/62 \times T)^2}$$

D=flow at any time t; Vi=volume of initial silicate and; Ci=$Na_2O$ concentration of the initial silicate expressed in g/liter; Ca=concentration of the acid used, expressed in g/liter; T=total time of the reaction; t=time.

The drawback of this process is that the addition of acid is intermittently interrupted for at least three times and this rate of addition is to be controlled by a number of variables shown in the equation above. Besides, as per this equation the rate of addition of an acid is continuously increased during the course of the neutralization process which is critical for obtaining good quality silica. This makes the process complex. Moreover, control of temperature at two different phased at variable rate of addition is difficult.

U.S. Pat. No. 4,495,167 discloses a process to prepare precipitated silica having specific surface area higher than 400 $m^2/g$, Dibutyl phthalate number higher than 300 and particle size having particles <63 μm. The process imbibe simultaneous addition of dilute sodium silicate and acid to water kept in the reaction vessel under continuous stirring and at 40 to 42° C. and maintaining the pH between 6 to 7. In this process, both the additions are stopped after $13^{th}$ minutes and the addition interrupted for 90 minutes and again resumed till the completion of the precipitation. The entire reaction mass is then properly dispersed using a turbine type shearing device. Prior to filtration, the reaction mass is aged at room temperature for a period in the range of 12–17 hours. The drawback of the this process is that (i) the addition rates are to be critically controlled to maintain the pH between 6 to 7; (ii) need of high shearing and (iii) aging the mass for 12–17 hours make the process economically unviable.

U.S. Pat. No. 5,094,829 discloses a process to prepare reinforced precipitated silica having BET specific surface in the range of 220 to 340 $m^2/g$ with pore diameter of ca. 9 to 20 nm. The process involves the neutralization of alkali metal silicate solution with acid in multiple stages, viz. (i) initial neutralization of 60% of the total alkali at ca. 30 to 40° C.; (ii) simultaneous addition of alkali metal silicate solution and acid to neutralize 60% of equivalent alkali at 80 to 85° C. for minimum period of 115 minutes; (iii) adding acid to lower the pH below 7 for two times (iv) aging the reaction mixture for at least three times in the entire process. The drawback associated with this process is that the multiple stages of neutralization, increasing the pH, lowering the pH with acid make the whole process complex. Besides, the entire process involves aging of the reaction mixture at three different stages for a pretty long time. This makes the process uneconomical.

U.S. Pat. Nos. 5,034,207 and 5,123,964 disclose processes to prepared silica with BET specific surface in the range of 150 to 350 $m^2/g$; bulk density between 60 to 120 g/l, and particles where at least 70% particles are from 1 to 6 μm. In this process, prior to neutralization of silicate solution, the later is heated to 70° to 80° C. and acid addition was continued till 50% of alkali present was neutralized and addition of the acid was interrupted for 30 to 120 minutes. Remaining acid was added till pH of suspension was around 3.0. The entire reaction mass is sheared at high speed for uniform dispersion. The silica suspension is optionally diluted with water and the coarse silica was separated by hydro-cyclone. The drawback of the process is that the addition of acid is interrupted for a very long period and reaction mass requires high shear which may adversely affect economics of the process.

U.S. Pat. No. 6,180,076 describes a process to prepare precipitated silica having BET specific surface in the range of 120–200 m$^2$/g, Dibutyl phthalate index 120–300 and some of the particles are of less than 1 μm after degradation of the particles by ultra-sonication. Here silica is obtained by the reaction of alkali metal silicate with mineral acid at temperature 65° to 95° C. at pH of 7.0 to 11.0 with continuous stirring, the reaction is continued up to solids concentration of 40 g/l –110 g/l, the final pH is adjusted to a value between 3 and 5. The over all reaction is completed in two steps: 1) Addition of water glass and acid for 15 to 25 minutes followed by interruption of the addition for 30 to 90 minutes. 2) Addition of water glass and acid for 50 to 70 minutes. Total reaction time is 130 to 140 minutes. The drawback associated with this process is the controlled rate of addition to maintain the pH of the reaction mixture and the overall reaction time is 2 to 2.5 hours make the process unattractive.

U.S. Pat. No. 5,342,598 describes a process wherein the silica particulates are prepared by simultaneous addition of sodium silicate and a diluted acid into a dispersion of colloidal silica, under continuous agitation. At the completion of the reaction the pH of the suspension is between 3 and 7. In this process, colloidal silica is used as a nucleating agent and is separately prepared by heating a sodium silicate solution at around 75° C. and adding acid until the final pH is around 9.5. The drawback of the process is that both the solutions are to be added simultaneously and their rates are to be controlled very critically. Moreover, dilute colloidal silica is needed for precipitation of silica.

U.S. Pat. No. 5,851,502 discloses that precipitated silica is prepared by is prepared by introducing water into a precipitation vessel, adding water glass until an alkali value is between 5–15 and simultaneously adding water glass solution and sulfuric acid until the pH of the reaction mass is around 8.5, interrupting precipitation for some time and then further continuing the neutralization with acid until the pH of the slurry is ca. 4. The drawback of the process is that both the solutions are to be added simultaneously and their rates are to be controlled very critically and spray drying is required for obtaining desired product, which required high energy input.

U.S. Pat. No. 6,214,912 describes a process for the preparation of silica including the reaction of a silicate of an alkali metal M with an acidifying agent, whereby a suspension of precipitated silica is obtained, and then the separation and the drying of this suspension, the said process being characterized in that the precipitation is carried out in the following manner: (i) an initial stock is formed comprising a part of the total quantity of the silicate of an alkali metal M involved in the reaction, the silicate concentration, expressed as SiO$_2$, in the said stock being lower than 20 g/l, (ii) the acidifying agent is added to the said initial stock until at least 5% of the quantity of M$_2$O present in the said initial stock is neutralized; (iii) acidifying agent is added to the reaction mire simultaneously with the remaining quantity of alkali metal silicate such that the consolidation ratio, that is to say the ratio of quantity of silicate added (expressed as SiO.sub.2)/quantity of silicate present in the initial stock (expressed as SiO$_2$) is between 12 and 100. Throughout the stage (iii) the added quantity of acidifying agent is preferably such that 80 to 99%, of the added quantity of M$_2$O is neutralized. Aging of the reaction mixture for 1 to 60 minutes, after the above mentioned simultaneous addition of silicate solution and acid, is carried out. Finally, after the precipitation, in a subsequent stage, an additional quantity of acidifying agent is added to the reaction mixture. This addition is generally made until a pH value of the reaction mixture of between 3 and 6.5, obtained. The drawback of this process is that during simultaneous addition of silicate and acid in stage (iii) in such a way that neutralization of the M$_2$O is between 80 to 99% of the total M$_2$O, which makes the process complicated.

US Patent Application No. 20030118500 discloses a process for preparation of precipitated silica, comprising the reaction of a silicate with an acidifying agent, whereby a suspension of precipitated silica is obtained, followed by separation and drying of this suspension, characterized in that: the precipitation is carried out in the following way: (i) an initial stock solution is formed containing at least some of the total amount of the silicate used in the reaction and at least one electrolyte, the concentration of silicate (expressed as SiO$_2$) in the said initial stock solution being between 50 and 60 g/l (ii) the acidifying agent is added to the said stock solution until a pH of between 7 and 8.5 for the reaction medium is obtained, (iii) the acidifying agent is added to the reaction medium along with, where appropriate, simultaneously, the remaining amount of the silicate, an additional amount of acidifying agent is added to the reaction medium, preferably until a pH of between 4 and 6 is obtained in the reaction medium. The separation comprises a filtration and washing operation using a filter equipped with a means of compacting, a suspension having a solids content of less than 17% by weight is dried by spraying. The drawback of the process is that both the solutions are to be added simultaneously and their rates are to be controlled very critically and spray drying is required for obtaining desired product, which required high energy input.

Indian Patent No. 176707 discloses a process for preparation of precipitated silica. Precipitated silica is prepared at ambient temperature (using hydrochloric acid) by preparing aqueous solution of sodium silicate having 1 to 1.3 N Na$^+$ ion concentration, adding 14–16% hydrochloric acid to the solution at constant rate over a period of 10–60 min under continuous stirring to bring down pH of resultant mixture to around 10.8, continuing addition of the same acid for 3–6 hour to bring down pH between 3–4 to obtain the precipitated silica separating, washing, drying and pulverizing the said separated silica by known methods. The drawback of this process is that for complete neutralization of alkali metal at ambient temperature takes very long time which makes process uneconomical. Besides the process has a imitation that of all the mineral acids, the process is feasible only with hydrochloric acid.

U.S. Pat. No. 6,702,888 describes a process for preparation of precipitated silica containing aluminum for their application in the reinforcement of the elastomers. The process involves addition of an acidifying agent, to a preheated sodium silicate solution containing 100 g SiO$_2$/liter and less than 17 g electrolyte/liter while maintaining temperature ca. 80° C., until the pH of the slurry is between 7.0 and 8.0. At this pH value, the remaining sodium silicate solution and the acidifying agent are added simultaneously at controlled rate while critically controlling the pH between 7.0 to 8.0 To this slurry diluted acid is added to bring the pH less than 7. The silica so obtained is separated by filtration and washed and filter cake is re-dispersed in water and to this either organic or inorganic salt of aluminum (Aluminum compound A) and a base is added simultaneously or an aluminate of alkali metal is added and pH of the reaction mixture is adjusted between 7.2 to 8.6. To this slurry again an acidifying agent is added to bring down the pH of the slurry between 3.4 and 4.5 and the product is separated by filtration and wet cake is dried to obtain a product. The drawback of the process is that silicate and acid solutions are added simultaneously and their rates of addition are to be controlled very critically. Moreover, the addition of aluminum compounds after filtering, washing and re-dispersing make the process overall complex and complicated.

U.S. Pat. No. 6,468,493 describes a process for the preparation of precipitated silica. The preparation is carried out in following way: i) an initial stock solution is prepared containing some of the total amount of silicate used in the reaction and at least one electrolyte. The silicate concentration in terms of $SiO_2$ in the said initial stock solution is in the range of 40 to 330 g/l and electrolyte concentration is in the range of 12 to 20 g/l. Acidifying agent is added to the stock solution until pH value of between 7 and 8.5 is obtained. To this solution an acidifying agent and remaining silicate solution is simultaneously added in such a way that the pH of the reaction mixture does not change. Subsequently an additional amount of acidifying agent is added to the reaction mixture to bring down the pH of the reaction mixture is kept in the range of 4.5 to 5.5. The temperature of the reaction medium is kept between 68° C. to 98° C. The drawback of the process is that initial addition of acid to bring down pH to below 8.5 is critical as it leads to probability of gel formation. Besides, in the simultaneous addition phase the rate are to be critically controlled to maintain the pH.

U.S. Pat. No. 6,800,267 describes a preparation of precipitated silica involving following steps; a) heating a mixture of water and sodium silicate at a temperature of from 70 to 86° C. and adding sulfuric acid until half of the sodium silicate is neutralized; b) aging the more for a time of from 30 to 120 minutes; c) adjust the pH of the mixture with sulfuric acid to a range of from 3.0 to 7.0, thereby precipitating the aluminum-doped silica; d) filtering the aluminum-doped silica from the mixture to form a filter cake and washing the filter cake; e) drying and/or grinding the washed filter cake, wherein an aluminum salt solution is metered into the mixture at step a) and/or step c), the precipitated aluminum-doped silica has a BET surface of more than 300 m.sup.2/g, an Al.sub.2 O.sub.3 content of from 0.05 to 0.25% by weight, and the aluminum is distributed uniformly in the aluminum-doped silica. Wherein at least one or more of steps a), b), and c) are carried out with shearing. The drawback of the process is that it requires shearing, which involves high energy input and reaction time is longer than that of present invention which, adversely affect the economy of the process.

OBJECTS OF THE INVENTION

The main objective of the invention is to provide a process for the preparation of amorphous silica from Kimberlite tailings which, obviates the drawbacks as detailed above.

Another object of the invention is to utilize the in-built silica present in Kimberlite tailing for the preparation of soluble silicates.

Still another objective of the invention is to use soluble silicate so prepared in the preparation of amorphous silica.

Yet another object of the invention is to prepare amorphous silica that is compatible for use in rubber, toothpaste, paint and paper industries.

Yet another object of the invention is prepare amorphous silica having bulk density from 0.09 to 0.16 gram per cc; average particle size of 10 micrometer; and surface area of about 200 to 400 square meter per gram.

SUMMARY OF THE INVENTION

The aim of the present invention is directed to provide a process for preparing a free flowing hydrated amorphous silica having low bulk density; fine particle size and silica content greater than 99% on anhydrous basis. The sodium silicate, prepared by reacting the silica present in acid treated Kimberlite with caustic soda, was used as a source of silica. The dilute silicate solution was neutralized with an acidifying agent viz. mineral acid under controlled conditions of concentration of reactants, temperature, time and mode of addition. During the neutralization process the reaction mass was continuously agitated to avoid the coagulation of particles. The present process can be carried in an open vessel and the product can be easily filtered by conventional techniques, dried and pulverized to obtain fine powder.

Accordingly, the present invention provides a process for preparing amorphous silica from Kimberlite tailings by neutralization of alkali metal present in a sodium silicate solution by mineral acid, the sodium silicate being prepared by dissolving silica present in Kimberlite tailing, the process comprising:

(i) treating Kimberlite tailings with a mineral acid and washing the acid treated tailings;
(ii) reacting the acid treated and washed Kimberlite tailings with caustic soda solution to obtain a reaction mass;
(iii) filtering reaction mass obtained in step (ii) to obtain sodium silicate solution as filtrate;
(iv) diluting the sodium silicate solution obtained in step (iii) to obtain a concentration of silica in the range of 40 to 125 grams per liter;
(v) diluting mineral acid to a concentration range of 2 to 15 N for use as an acidifying agent;
(vi) adjusting $Na^+$ ion concentration in sodium silicate solution to a range of 0.5 to 1.5 moles per liter;
(vii) heating the diluted sodium silicate solution;
(viii) adding the diluted acid of step (v) to the heated sodium silicate solution of step (vii) to partially neutralize alkali in the silicate solution;
(ix) intermittently aging the partially neutralized silicate solution obtained in step (viii) for a time ranging from 5 to 20 minutes under stirring,
(x) adding the remaining acid to complete neutralization of alkali present in sodium silicate solution;
(xi) bringing final pH of solution to range of 2 to 6 to completely precipitate silica;
(xii) filtering slurry the silica precipitate out and washing the obtained cake till it is free from sulfate ions, drying and pulverizing the dried cake to obtain fine silica powder.

In one embodiment of the invention the Kimberlite tailing used has the following chemical constituents 30–32% silica; 2–5% $Al_2O_3$; 5–8% $TiO_2$; 8–10% CaO; 20–24% MgO; 5–11% $Fe_2O_3$ and loss on ignition in the range of 13–15%.

In another embodiment of the invention, the mineral acid used is selected from the group consisting of HCl and $HNO_3$ and the acid treatment in step (i) is effected at a temperature in the range of 75 to 100° C., in acid concentration range of 1 to 10 N and period of reaction in the range of 1 to 6 hours.

In yet another embodiment of the invention, the acid treated Kimberlite tailing is treated with the sodium hydroxide solution in a concentration range of 6 to 10% at either boiling temperature in an open vessel or at higher temperature in the range of 95 to 200° C. in a closed vessel and for a period in the range of 1 to 6 hours.

In another embodiment of the invention the alkali treated reaction mass is filtered to obtain sodium silicate solution and the residue is disposed off.

In another embodiment of the invention, the concentration of silica in sodium silicate solution is varied in the range of 40 to 125 grams per liter.

In another embodiment of the invention, the acidifying agent is a mineral acid selected from the group consisting of HCl and $HNO_3$ and the concentration thereof is varied in the range of 2 to 15 N.

In another embodiment of the invention, the $Na^+$ concentration in the sodium silicate solution is varied in the range of 0.5 to 1.5 moles per liter.

In another embodiment of the invention, the total volume of sodium silicate solution is taken in a reaction vessel and heated to a temperature in the range of 50 to 90° C. under continuous stirring.

In another embodiment of the invention, the alkali present in sodium silicate solution is partially neutralized in the range of 10 to 40% by addition of diluted acid at a constant rate for a time in the range of 5 to 15 minutes at elevated temperature and under constant stirring.

In another embodiment of the invention, the remaining alkali present in sodium silicate solution is neutralized by addition of dilute acid for a time in the range of 20 to 60 minutes, at the same temperature and under constant stirring till pH of final slurry is in the range of 2 to 6.

In another embodiment of the invention, the aqueous slurry containing amorphous silica is filtered, washed with tap water till free from sulphate ions, dried in air circulated drier and pulverized to obtain fine powder.

In another embodiment of the invention, the final pH of the slurry is brought to the range of 3 to 5 to completely precipitate the silica.

DETAILED DESCRIPTION OF THE INVENTION

In the process of the invention, Kimberlite tailing is treated with mineral acid at about 100° C. to remove acid soluble matter and thereby Kimberlite enriched with silica is obtained. This acid treated Kimberlite is digested with caustic soda at 100° C. to 190° C. in stainless steel jacketed reactor with continuous stirring for desired time 3 to 6 hours. The liquid sodium silicate is separated by filtration. Sodium silicate thus obtained is diluted with water to adjust desired $SiO_2$ concentration is the range of 40 to 125 g/l and desired $Na^+$ ion concentration in the solution is adjusted by addition of an electrolyte in the range of 0.5 to 1.5 moles per liter. This solution is heated to desired temperature in the range of 50° C. to 90° C. and neutralized with 2 to 15 N mineral acid in two steps. In the first step 10 to 40% of the total alkali present in the solution is neutralize in 5 to 15 minutes, after this partial neutralization acid addition is interrupted for 5 to 20 minutes. In the second stage acid addition is resumed and final pH of the solution is adjusted to 2 to 6. Precipitated silica thus obtained is separated by filtration and filter cake is washed thoroughly till free from sulfate ions. The product is dried and pulverized to obtain fine powder.

Methods of Characterization of Product

The finished product, precipitated silica prepared using Sulfuric acid and sodium silicate is characterized for bulk density, pH, Oil absorption, Water absorption, specific surface area and particle size analysis.

Determination of Bulk Density

The method prescribed by the Indian Standard Specification (10) for 'Light Basic Magnesium Carbonate for Rubber Industry' was adopted to determine the bulk density. The apparatus consists of wooden stand, a measuring cylinder with rubber cork. The distance between zero and 250 ml graduation mark is 200 mm. The height of the free fall of the cylinder was 25 mm. A pre-weighed quantity (W) of the sieve and dried sample is gently slipped in to cylinder. The cylinder with the rubber cork is then assembled in to the wooden stand. The cylinder is gently raised to a height of 25 mm in such a way that it did not dash with the upper stop and then released smoothly. The timing of rising and releasing were adjusted so that one tap is given at every two seconds. Total 50 taps are given. The volume (V) is noted and bulk density calculated as under;

Bulk density (g/cc)=Weight of powder (W)/Volume of Powder (v)

Determination of pH

Exactly 5.0 g of thoroughly mixed, oven-dried sample is taken in a 150 ml capacity beaker. To this 100 ml of distilled water fee from dissolved carbon dioxide, cations and anions is added. The powder is uniformly dispersed by means of glass rod. The pH meter is standardized with standard buffer solution and pH of the silica slurry prepared is measured.

Determination of Oil Absorption

The apparatus consists of a glass plate, 6 inches by 6 inches fixed in a wooden frame and sharp edged stainless steel spatula (2 inches width) with handle.

Accurately weighed 5.0 g of sample is placed on the plate. A burette is filled with double boiled linseed oil. Oil is added drop by drop into the powder and mixed with powder by means of a spatula. Test is completed when oil mixed with powder produces a stiff, putty like paste, which does not break or separate. Volume of oil added is noted. From the density of oil, the weight of oil is calculated. From this, the percentage oil absorption is calculated.

Determination of Water Absorption

Known weight of sample (~5.0 g) is taken in clean dried 250.0 $cm^3$ beaker. To this distilled water from burette is added drop wise and mixed with powder by means of spatula. Test is completed when water mixed with powder produces, a stiff, putty like paste, which does not break or separate. The volume of water added is noted. From the density of water, the weight of water is calculated. From this, the percentage water absorption is calculated.

Determination of Specific Surface Area

Specific surface area is determined using Surface area analyzer by Brunauer, Emmet and Teller method described in Journal of American Chemical Society, Volume 60, page 309 (1938). The method involves measurement of nitrogen adsorption at liquid nitrogen temperature at different partial pressure of the nitrogen and using BET equation monolayer capacity is calculated and from that specific surface area is calculated.

Determination of Particle Size

Particle size of the product is determined by laser diffraction technique. The dry dispersion method was employed for the determination of particle size using Mastersizer 2000 (Malvern Instrument Ltd., Malvern UK).

| Product Specifications | | |
|---|---|---|
| Properties | Invention Product | Sipernat 22 LS (Degussa) |
| BET surface area (m²/g) | 195 | 190 |
| Bulk density (g/cc) | 0.09 | 0.08 |
| Moisture (%) (Drying loss 2 h at 105° C.) | 4.2 | 6.0 |
| Loss on ignition (2 h at 1000° C.) (%) | 5.2 | 5.0 |
| Oil absorption value (g/100 g) | 230 | — |
| DBP absorption value (g/100 g) | — | 270 |
| pH value (5% aqueous dispersion) | 6.3 | 6.3 |

Free flowing hydrated amorphous silica in accordance with the invention, can be prepared from silicon dioxide ($SiO_2$) in-built in Kimberlite tailings, which is waste in diamond mining. Prior to alkali (caustic soda) treatment, Kimberlite—tailing is treated with mineral acid to dissolve acid soluble salts. Soluble alkali metal silicate so formed is filtered to remove insoluble impurities. Alkali ($Na_2O$) in diluted metal silicate solution is neutralized with a mineral acid under a wide range of variables as described in the text. Silica so prepared is filtered, washed, dried and pulverized by conventional techniques. The prior art does not divulge nor teach how silica can be prepared from Kimberlite—tailing. It is reported for the first time in the present invention how the in-built silicon dioxide from Kimberlite—tailing can be extracted and utilized for preparing amorphous silica. The invented steps adopted in the present invention are (i) the simple neutralization steps dispense the multi stage neutralization; (ii) the pH of the reaction mass is maintained on alkaline side until 95% of alkali is neutralized; (iii) the process of neutralization is interrupted for a short period. This obviates the need of very long interruption time; (iv) the complete neutralization of alkali is achieved in ca. 65 to 70 minutes. Long reaction time is adversely affect the economics of the process; (v) the time of adding of mineral acid only to be controlled and regulated. In the simultaneous addition of acid and silicate solution, the rate of addition of both the reactant solutions and pH of the reaction mass are critically controlled.

The following examples are given by way of illustration and therefore sold not be constructed to limit the scope of the present invention.

EXAMPLE-1

2.7 kg of Kimberlite was treated with 1:1 hydrochloric acid: water mixture at 95–100° C. under continuous stirring keeping solid to liquid ratio 1:4 for 3 hrs, then the slurry was filtered and washed with tap water till wet solid cake becomes free from acid. The cake was dried in oven at 100–110° C. and is used for preparation of sodium silicate. For preparation of sodium silicate 0.64 kg of an alkali was dissolved in a 8 lit of water and taken in to stainless steel autoclave. To this 2 kg of acid treated Kimberlite was added under continuous stirring to prepare homogenous slurry. Reactor was heated for 1 to 3.5 hours at boiling temperature. After completion of reaction, slurry was filtered with vacuum filter. Filtrate was analyzed for $SiO_2$ and $Na_2O$. $SiO_2/Na_2O$ mole ratio was 3–3.6 depending on time of digestion with alkali.

EXAMPLE-2

199 g of a of sodium silicate containing $SiO_2$=17.66%, $Na_2O$=5.64%; $SiO_2/Na_2O$ with modulus of 3.24, was introduced into a stainless steel reactor equipped with a pitch blade stirrer and diluted to 640 ml to adjust the silica concentration of 55 g per liter. The $Na^+$ ion concentration of this solution was adjusted to 22.3 g per liter by adding soluble sodium salt. Prior to initial neutralization process, solution of sodium silicate was heated and temperature was raised to 70° C. and 2.3 N sulfuric acid was added at controlled rate of 6.2 ml per minute for the period of 5 minutes. After 5 minutes, acid addition was interrupted for 10 minutes. Then remaining acid of same concentration was added at rate of 3.6 ml/minute till pH of reaction mixture is 4. The slurry is then agitated for another 5 minutes, filtered, washed till free from adhering anions, dried in air circulated oven and comminuted to fine size. The properties of the silica are (i) average particle size=10.25 μM; (ii) BET Specific surface area=380 m²/g; (iii) bulk density=0.1 g/cc; (iv) oil absorption capacity=225 g/100 g; (iv) moisture=4.0%; (v) loss on ignition=6.0% and (vi) pH (5% aqueous suspension)=7.3.

EXAMPLE-3

201 g of a of sodium silicate containing $SiO_2$=13.9%, $Na_2O$=4.78%; $SiO_2/Na_2O$ having modulus of 3.2, was introduced into a stainless steel reactor equipped with a pitch blade stirrer and diluted to 466 ml to adjust the silica concentration of 60 g/liter. The $Na^+$ ion concentration of this solution was adjusted to 22.7 g/liter by adding soluble sodium salt. Prior to initial neutralization process, solution of sodium silicate was heated and temperature was raised to 70° C. and 2.39 N sulfuric acid was added at controlled rate of 6.5 ml per minute for a period of 5 minutes. After 5 min acid addition was interrupted for 10 minutes. Then remaining acid of same concentration was added at the rate of 2.8 ml/minute till pH of reaction mixture is 4. Slurry is then agitated for another 5 minutes, filtered, washed till free from adhering anions, dried in air circulated oven and comminuted to fine size. Properties of the silica are (i) bulk density=0.13 g/cc; (ii) oil absorption capacity=251 g/100 g; (iii) moisture=7.0%; (iv) loss on ignition=5.0% and (v) pH (5% aqueous suspension)=7.0.

EXAMPLE-4

25 kg of sodium silicate containing $SiO_2$=14.63%, $Na_2O$=4.77%; $SiO_2/Na_2O$ modulus of 3.2, was introduced into stainless steel reactor equipped with pitch blade stirrer and diluted to 81.3 liters to adjust silica concentration to 45 g/liter. $Na^+$ ion concentration of this solution was adjusted to 20.0 g/liter by adding soluble sodium salt. Prior to initial neutralization process, solution of sodium silicate was heated and temperature was raised to 70° C. and 2.47 N sulfuric acid was added at controlled rate of 550 ml/minute for a period of 5 minutes. After 5 min acid addition was interrupted for 10 minutes. Then remaining acid of the same concentration was added at the rate of 360 ml per minute until the pH of the reaction mixture is 4. The slurry is then agitated for another 5 minutes, filtered, washed till free from adhering anions, dried in air circulated oven and comminuted to fine size. The properties of the silica are (i) BET Specific surface area=290 m²/g; (ii) bulk density=0.14 g/cc; (iii) oil absorption capacity=190 g/100 g; (iv) pH (5% aqueous suspension)=7.5 (v) moisture=5.7

EXAMPLE-5

2.84 kg of a of sodium silicate containing $SiO_2$=12.92%, $Na_2O$=3.7%; $SiO_2/Na_2O$ having modulus of 3.6, was introduced into a stainless steel reactor equipped with a pitch blade stirrer and diluted to 3.5 liter to adjust the silica concentration of 105 g per liter. The $Na^+$ ion concentration of this solution was adjusted to 22.3 g per liter with the addition of soluble sodium salt. Prior to initial neutralization process, the solution of sodium silicate was heated and temperature was raised to 80° C. and 5.1 N sulfuric acid was added at controlled rate of 11.6 ml per minute for the period of 10 minutes. After 10 min acid addition was interrupted for 8 minutes. Then remaining acid of the same concentration was added at the rate of 20.4 ml per minute until the pH of the reaction mixture is 4. The slurry is then agitated for another 5 minutes, filtered, washed till free from adhering anions, dried in air circulated oven and comminuted to fine size. The product having 0.11 cc/g of bulk density and 195 g/100 g of oil absorption capacity was obtained.

EXAMPLE-6

71 kg of a of sodium silicate containing $SiO_2$=9.35%, $Na_2O$=3.27%; $SiO_2/Na_2O$ having modulus of 3.6, was introduced into a stainless steel reactor equipped with a pitch blade stirrer and diluted to 70 liter to adjust the silica concentration of 95 g per liter. The $Na^+$ ion concentration of this solution was adjusted to 24.6 g per liter with the addition of soluble sodium salt. Prior to initial neutralization process, the solution of sodium silicate was heated and temperature was raised to 78° C. and 5.1 N sulfuric acid was added at controlled rate of 440 ml per minute for the period of 10 minutes. After 10 min acid addition was interrupted for 10 minutes. Then remaining acid of the same concentration was added at the rate of 456 ml per minute until the pH of the reaction mixture is 4. The slurry is then agitated for another 5 minutes, filtered, washed till free from adhering anions, dried in air circulated oven and comminuted to fine size. The properties of the silica are (i) bulk density=0.1 g/cc; (ii) oil absorption capacity=225 g/100 g; (iii) moisture=5.4%; and (iv) loss on ignition=6.5%.

EXAMPLE-7

201 g of a of sodium silicate containing $SiO_2$=13.9%, $Na_2O$=4.78%; $SiO_2/Na_2O$ having modulus of 3.2, was introduced into a stainless steel reactor equipped with a pitch blade stirrer and diluted to 622 ml to adjust the silica concentration of 45 g per liter. The $Na^+$ ion concentration of this solution was adjusted to 20.0 g per liter with the addition of soluble sodium salt. Prior to initial neutralization process, the solution of sodium silicate was heated and temperature was raised to 90° C. and 2.39 N sulfuric acid was added at controlled rate of 5.7 ml per minute for the period of 5 minutes. After 5 min acid addition was interrupted for 10 minutes. Then remaining acid of the same concentration was added at the rate of 2.8 ml per minute until the pH of the reaction mixture is 4. The slurry is then agitated for another 5 minutes, filtered, washed till free from adhering anions, dried in air circulated oven and comminuted to fine size. The properties of the silica are (i) bulk density=0.1 g/cc, (ii) oil absorption capacity=240 g/100 g and pH of 5% aqueous suspension=7.3.

EXAMPLE-8

2.84 kg of a of sodium silicate containing $SiO_2$=12.92%, $Na_2O$=3.7%; $SiO_2/Na_2O$ having modulus of 3.6, was introduced into a stainless steel reactor equipped with a pitch blade stirrer and diluted to 3.5 liter to adjust the silica concentration of 105 g per liter. The $Na^+$ ion concentration of this solution was adjusted to 22.3 g per liter with the addition of soluble sodium salt. Prior to initial neutralization process, the solution of sodium silicate was heated and temperature was raised to 80° C. and 5.1 N sulfuric acid was added at controlled rate of 16 ml per minute for the period of 10 minutes. After 10 min acid addition was interrupted for 5 minutes. Then remaining acid of the same concentration was added at the rate of 19 ml per minute until the pH of the reaction mixture is 4. The slurry is then agitated for another 5 minutes, filtered, washed till free from adhering anions, dried in air circulated oven and comminuted to fine size. The properties of the product are (i) bulk density=0.15 g/cc and oil absorption capacity=230 g/100 g

EXAMPLE-9

2.84 kg of a of sodium silicate containing $SiO_2$=12.92%, $Na_2O$=3.7%; $SiO_2/Na_2O$ having modulus of 3.6, was introduced into a stainless steel reactor equipped with a pitch blade stirrer and diluted to 3.5 liter to adjust the silica concentration of 105 g per liter. The $Na^+$ ion concentration of this solution was adjusted to 22.3 g per liter with the addition of soluble sodium salt. Prior to initial neutralization process, the solution of sodium silicate was heated and temperature was raised to 80° C. and 5.1 N sulfuric acid was added at controlled rate of 9.3 ml per minute for the period of 15 minutes. After 15 win acid addition was interrupted for 8 minutes. Then remaining acid of the same concentration was added at the rate of 20 ml per minute until the pH of the reaction mixture is 4. The slurry is then agitated for another 5 minutes, filtered, washed till free from adhering anions, dried in air circulated oven and comminuted to fine size. The properties of the product are (i) bulk density=0.13 g/cc and oil absorption capacity=186 g/100 g.

EXAMPLE-10

3.2 kg of a of sodium silicate containing $SiO_2$=9.35%, $Na_2O$=3.27%; $SiO_2/Na_2O$ having modulus of 3.6, was introduced into a stainless steel reactor equipped with a pitch blade stirrer and diluted to 3.15 liter to adjust the silica concentration of 95 g per liter. The $Na^+$ ion concentration of this solution was adjusted to 24.6 g per liter with the addition of soluble sodium salt. Prior to initial neutralization process, the solution of sodium silicate was heated and temperature was raised to 78° C. and 5.35 N sulfuric acid was added at controlled rate of 19.4 ml per minute for the period of 10 minutes. After 10 min acid addition was interrupted for 10 minutes. Then remaining acid of the same concentration was added at the rate of 20.0 ml per minute until the pH of the reaction mixture is 4. The slurry is then agitated for another 5 minutes, filtered, washed till free from adhering anions, dried in air circulated oven and comminuted to fine size. The properties of the silica are (i) BET Specific surface area=195 $m^2/g$ (ii) bulk density=0.09 g/cc; (iii) oil absorption capacity=230 g/100 g; (iv) moisture=4.2%; and (v) loss on ignition=5.2% (vi) pH=6.3.

Advantages of the Present Invention
1. Kimberlite tailings—a waste of diamond is utilized for the preparation of amorphous silica. It alleviates the disposal problem of Kimberlite.
2. The in-built silica in Kimberlite can be easily made soluble in alkali solution at boiling temperature and atmospheric pressure.
3. The invention alleviates the precise control of pH of the reaction mass during the simultaneous addition of acid and alkali metal silicate solutions.
4. Simple neutralization procedure is adopted wherein the rate of addition of diluted acid is only to be controlled.
5. The process dispenses the need of linger aging period.
6. Neutralization of alkali present in alkali metal silicate solution with mineral acid can be completed in short duration.

We claim:

1. A process for preparing amorphous silica from Kimberlite tailings, the process comprising:
    (i) treating Kimberlite tailings with a mineral acid and washing acid treated tailings;
    (ii) reacting the acid treated and washed Kimberlite tailings with caustic soda solution to obtain a reaction mass;
    (iii) filtering reaction mass obtained in step (ii) to obtain sodium silicate solution as filtrate;
    (iv) diluting the sodium silicate solution obtained in step (iii);
    (v) diluting mineral acid to a concentration range of 2 to 15 N for use as an acidifying agent;
    (vi) adjusting $Na^+$ ion concentration in the diluted sodium silicate solution to a range of 0.5 to 1.5 moles per liter;
    (vii) heating the diluted sodium silicate solution;
    (viii) adding the diluted acid of step (v) to the heated sodium silicate solution of step (vii) to partially neutralize alkali in the silicate solution;
    (ix) intermittently aging the partially neutralized silicate solution obtained in step (vii) for a time ranging from 5 to 20 minutes under stirring;
    (x) adding the remaining acid to complete neutralization of alkali present in sodium silicate solution;
    (xi) bringing final pH of solution to range of 2 to 6 to completely precipitate silica;
    (xii) filtering the solution to obtain a cake and washing the obtained cake until it is free from sulfate ions, drying and pulverizing dried cake to obtain fine silica powder.

2. A process as claimed in claim 1 wherein the Kimberlite tailing used has the following chemical constituents 30–32% silica; 2–5% $Al_2O_3$; 5–8% $TiO_2$; 8–10% CaO; 20–24% MgO; 5–11% $Fe_2O_3$ and loss on ignition is in the range of 13–15%.

3. A process as claimed in claim 1 wherein the mineral acid of step (i) is selected from the group consisting of HCl and $HNO_3$.

4. A process as claimed in claim 1 wherein the acid treatment in step (i) is effected at a temperature in the range of 75 to 100° C., acid concentration range of 1 to 10 N and period of reaction in the range of 1 to 6 hours.

5. A process as claimed in claim 1 wherein the acid treatment Kimberlite tailing of step (ii) is treated with a caustic soda solution with sodium hydroxide in a concentration range of 6 to 10%.

6. A process as claimed in claim 5 wherein the treatment is effected at either boiling temperature in an open vessel or at a temperature in the range of 95 to 200° C. in a closed vessel, and for a period in the range of 1 to 6 hours.

7. A process as claimed in claim 1 wherein the alkali treated reaction mass of step (iii) is filtered to obtain sodium silicate solution and a reside, wherein the residue is disposed off thereafter.

8. A process as claimed in claim 1 wherein the concentration of the silica in sodium silicate solution in step (iv) is varied in the range of 40 to 125 grams per liter.

9. A process as claimed in claim 1 wherein the acidifying agent in step (v) is a mineral acid selected from the group consisting of HCl and $HNO_3$.

10. A process as claimed in claim 9 wherein the concentration of the acidifying agent is in the range of 2 to 15 N.

11. A process as claimed in claim 1 wherein in step (vii) the sodium silicate solution is heated to a temperature in the range of 50 to 90° C. and under continuous stirring.

12. A process as claimed in claim 1 wherein in step (viii) the alkali present in sodium silicate solution is partially neutralized in the range of 10 to 40% by addition of diluted acid at a constant rate for a time in the range of 5 to 15 minutes at elevated temperature and under constant stirring.

13. A process as claimed in claim 1 wherein in step (x) the alkali present in sodium silicate solution is neutralized by addition of dilute acid for a time in the range of 20 to 60 minutes, at same temperature as in step (viii) and under constant stirring till pH of final slurry is in the range of 2 to 6.

14. A process as claimed in claim 1 wherein in step (xii) the solution containing amorphous silica is filtered, washed with tap water till free from sulphate ions, dried in air circulated drier and pulverized to obtain fine powder.

15. A process as claimed in claim 1 wherein in step (xi) the final pH of the solution is brought to the range of 3 to 5 to completely precipitate the silica.

* * * * *